US012118882B2

(12) United States Patent
Shao et al.

(10) Patent No.: US 12,118,882 B2
(45) **Date of Patent: *Oct. 15, 2024**

(54) METHOD AND INTERNET OF THINGS SYSTEM FOR TIDAL LANE OPENING MANAGEMENT IN SMART CITY

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Bin Liu, Chengdu (CN); Xiaojun Wei, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,147

(22) Filed: Sep. 11, 2023

(65) Prior Publication Data

US 2023/0419827 A1 Dec. 28, 2023

Related U.S. Application Data

(63) Continuation of application No. 18/048,869, filed on Oct. 24, 2022, now Pat. No. 11,837,086.

(30) Foreign Application Priority Data

Sep. 9, 2022 (CN) ......................... 202211099996.7

(51) Int. Cl.
*G08G 1/08* (2006.01)
*G08G 1/01* (2006.01)

(52) U.S. Cl.
CPC ............ *G08G 1/08* (2013.01); *G08G 1/0125* (2013.01)

(58) Field of Classification Search
CPC ...... G08G 1/08; G08G 1/0125; G08G 1/0116; G08G 1/0141; G08G 1/0145;
(Continued)

(56) References Cited

U.S. PATENT DOCUMENTS

2017/0278388 A1* 9/2017 Bansal ................. G08G 1/0125
2018/0172465 A1 6/2018 Nomura

FOREIGN PATENT DOCUMENTS

CN 106192796 A 12/2016
CN 106327899 A 1/2017
(Continued)

OTHER PUBLICATIONS

First Office Action in Chinese Application No. 202211099996.7 mailed on Nov. 8, 2022, 22 pages.
(Continued)

*Primary Examiner* — Joseph H Feild
*Assistant Examiner* — Sharmin Akhter
(74) *Attorney, Agent, or Firm* — METIS IP LLC

(57) ABSTRACT

A method for tidal lane opening management in a smart city is provided. The method applied to the management platform includes issuing a data obtaining instruction to a sensor network platform to obtain a first traffic feature of a target road within a first time period from an object platform, wherein the first traffic feature is a feature reflecting a flow situation of the target road, determining a target tidal lane opening scheme of the target road within the first time period based on the first traffic feature using a preset algorithm, generating a scheme execution instruction based on the target tidal lane opening program, sending the scheme execution instruction to the target object through, and issuing a data upload instruction to send the target tidal lane opening scheme to the user platform through a service platform.

20 Claims, 7 Drawing Sheets

(58) Field of Classification Search
CPC ....... G08G 1/096741; G08G 1/096775; G08G 1/0129; G06Q 10/0637; G06Q 10/0639; G06Q 10/103; G06Q 50/06; G06N 3/126; G06N 20/00; G16Y 10/40
See application file for complete search history.

(56) References Cited

FOREIGN PATENT DOCUMENTS

| | | | |
|---|---|---|---|
| CN | 106910353 | A | 6/2017 |
| CN | 107730920 | A | 2/2018 |
| CN | 108986487 | A | 12/2018 |
| CN | 109766405 | A | 5/2019 |
| CN | 110733507 | A | 1/2020 |
| CN | 110751325 | A | 2/2020 |
| CN | 110930696 | A | 3/2020 |
| CN | 111369789 | A | 7/2020 |
| CN | 114418468 | A | 4/2022 |
| CN | 114627648 | A | 6/2022 |

OTHER PUBLICATIONS

Decision to grant a patent in Chinese Application No. 202211099996.7 mailed on Feb. 3, 2023, 9 pages.
Li, Meng et al., Research on Tidal Lane Scheme Setting under Dynamic Traffic Assignment, China Transportation Review, 37(7): 78-86, 2015.
Rao, Lei et al., Identification and Analysis of Tidal Traffic Congestion Sections Based on Commuter Trajectories, Geospatial Information, 2021, 10 pages.
Cheng, Shifen et al., Multi-task and Multi-view Learning Based on Particle Swarm Optimization for Short-term Traffic Forecasting, Knowledge-Based Systems, 180: 116-132, 2019.

* cited by examiner

METHOD AND INTERNET OF THINGS SYSTEM FOR TIDAL LANE OPENING MANAGEMENT IN SMART CITY

CROSS-REFERENCE TO RELATED APPLICATIONS

This application is a continuation of U.S. application Ser. No. 18/048,869, filed on Oct. 24, 2022, which claims priority to Chinese Patent Application No. 202211099996.7, filed on Sep. 9, 2022, the entire contents of each of which are incorporated herein by reference.

TECHNICAL FIELD

The present disclosure relates to the field of Internet of Things, and in particular, to a method and an Internet of Things system for tidal lane opening management in a smart city.

BACKGROUND

There is often a "tidal phenomenon" in urban traffic, that is, every morning, the traffic flow in the direction of entering the city is large, the traffic flow in the direction of leaving the city is small, and the traffic condition is opposite in the evening. At present, this phenomenon can be alleviated by setting tidal lanes. However, the control of the opening time of tidal lanes, the flow direction of tidal lanes, and the number of tidal lanes needs to be relatively adjusted according to road traffic conditions with dynamic changes.

Therefore, it is hoped to provide a method and an Internet of Things system for tidal lane opening management in a smart city, which can manage the opening time of the tidal lanes, the flow direction of the tidal lanes, and the number of the tidal lanes.

SUMMARY

According to one or more embodiments of the present disclosure, a method for tidal lane opening management in a smart city is provided. The method applied to the management platform includes:

- issuing a data obtaining instruction to a sensor network platform to obtain a first traffic feature of a target road within a first time period from an object platform through the sensor network platform, wherein the first traffic feature is a feature reflecting a flow situation of the target road, determining a target tidal lane opening scheme of the target road within the first time period based on the first traffic feature using a preset algorithm, wherein the target tidal lane opening scheme is a scheme for managing an opening time of a tidal lane, a flow direction of the tidal lane, and a number of tidal lanes for the target road, generating a scheme execution instruction based on the target tidal lane opening program, sending the scheme execution instruction to the object platform through the sensor network platform, the object platform configured to control the target road based on the scheme execution instruction, and issuing a data upload instruction to send the target tidal lane opening scheme to a user platform through a service platform, wherein the user platform is configured for a user to consult opening information of the tidal lane.

According to one or more embodiments of the present disclosure, an Internet of Things system for tidal lane opening management in a smart city is provided, including a user platform, a service platform, a management platform, a sensor network platform, and an object platform, wherein the sensor network platform is configured to obtain a first traffic feature of a target road within a first time period from the object platform through the sensor network platform based on a data obtaining instruction, wherein the first traffic feature is a feature reflecting a flow situation of the target road, the management platform is configured to determine a target tidal lane opening scheme of the target road within the first time period based on the first traffic feature using a preset algorithm, wherein the target tidal lane opening scheme is a scheme for managing an opening time of a tidal lane, a flow direction of the tidal lane, and the number of tidal lanes for the target road, the service platform is configured to send the target tidal lane opening scheme to the user platform based on a data upload instruction, the object platform is configured to generate a scheme execution instruction based on the target tidal lane opening scheme and control the target road based on the scheme execution instruction, and the user platform is configured for a user to consult opening information of the tidal lane.

According to one or more embodiments of the present disclosure, a non-transitory computer-readable storage medium is provided, and a computer program is stored on the storage medium, wherein the computer, after reading the program, executes the method for tidal lane opening management in a smart city.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein.

DETAILED DESCRIPTION

The technical solutions of the embodiments of the present disclosure will be more clearly described below, and the accompanying drawings that need to be configured in the description of the embodiments will be briefly described below. Obviously, the drawings in the following description are only some examples or embodiments of the present disclosure. For those skilled in the art, the present disclosure may also be applied to other similar situations according to these drawings without paying creative labor. Unless it is obvious or explained in the language environment, the same number in drawings represents the same structure or operation.

It should be understood that the "system", "device", "unit" and/or "module" used herein is a method for distinguishing different components, elements, components, parts, or assemblies of different levels. However, if other words may achieve the same purpose, the words may be replaced by other expressions.

As shown in the present disclosure and claims, unless the context clearly prompts the exception, "a", "one", and/or "the" is not specifically singular form, and the plural form may be included; the plural form may be also intended to include the singular form as well. Generally speaking, the terms "comprise" and "include" only imply that the clearly identified steps and elements are included, and these steps and elements may not constitute an exclusive list, and the method or device may further include other steps or elements.

The flowcharts are used in the present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

Figure 1:
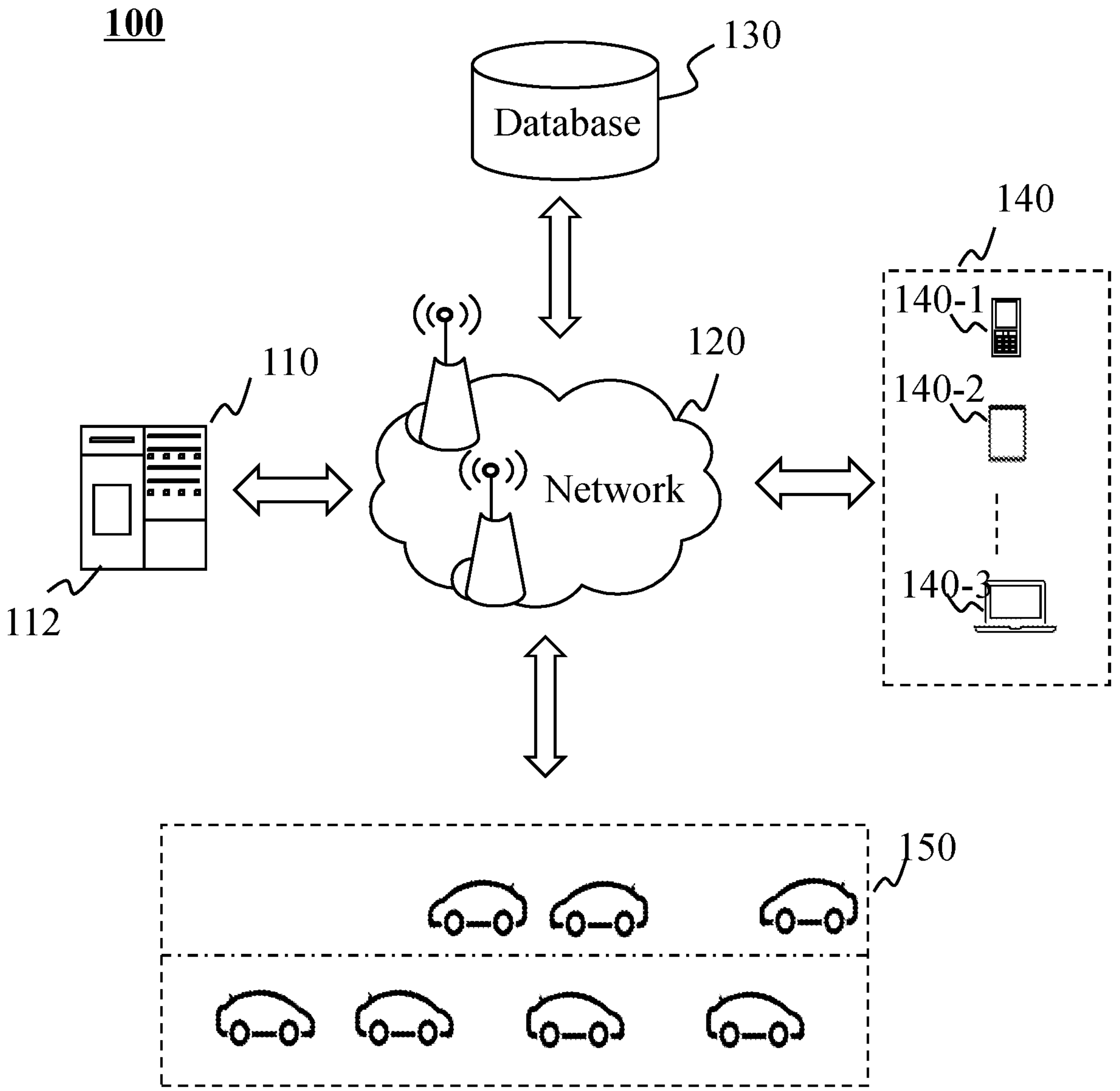
FIG. 1 is a schematic diagram illustrating an application scenario of an Internet of Things system for traffic diversion management in a smart city according to some embodiments of the present disclosure.

FIG. 1 is a schematic diagram illustrating an application scenario of an internet of things system for traffic diversion management in a smart city according to some embodiments of the present disclosure.

In some embodiments, the application scenario 100 of the Internet of Things system for traffic diversion management in a smart city may include a server 110, a network 120, a database 130, a terminal device 140, and a target road 150. The server 110 may include a processing device 112.

In some embodiments, the application scenario 100 of the Internet of Things system for traffic diversion management in a smart city may control a target road by performing the methods and/or processes disclosed in the present disclosure. For example, the processing device 112 may receive a user-initiated traffic diversion management task based on the user platform, obtain a first traffic feature of the target road in a first time period from an object platform based on the sensor network platform; determine a target tidal lane opening scheme for a target road in the first time period based on the first traffic feature; and send the target tidal lane opening scheme to the object platform via the sensor network platform. The service platform is configured to send the target tidal lane opening scheme to the user platform. The object platform is configured to control the target road based on the target tidal lane opening scheme. More descriptions regarding the target road, the first time period, the first traffic feature, and the target tidal lane opening scheme may be found in FIG. 3 and its relevant descriptions.

The server 110 and the terminal device 140 may be connected via the network 120, and the server 110 may be connected to the database 130 via the network 120. The server 110 may include the processing device 112, and the processing device 112 may be configured to perform the method for traffic diversion management in a smart city described in some embodiments of the present disclosure. The network 120 may connect the components of the application scenario 100 with each other and/or connect the Internet of Things system with external resource components. The database 130 may be configured to store data and/or instructions. For example, the database may store a first traffic feature, a second traffic feature, candidate tidal lane opening schemes, and a target tidal lane opening scheme. The database 130 may be directly connected to the server 110 or located in the server 110. The terminal device 140 refers to one or more terminal devices or software. In some embodiments, terminal device 140 may serve as a user platform to receive instructions from a user. For example, when a user of the terminal device initiates a traffic diversion management task, the user platform receives the user-initiated traffic diversion management task. In some embodiments, terminal device 140 may serve as a management platform. Exemplarily, the terminal device 140 may include devices with input and/or output capabilities, such as a mobile device 140-1, a tablet computer 140-2, a laptop computer 140-3, or the like, or any combination thereof.

The target road 150 may be a road that requires traffic diversion management. For example, the target road 150 refers to a road arranged with a tidal lane. The tidal lane refers to a reversible lane that changes the direction of vehicle movement in response to traffic flow demands. More descriptions regarding the target road may be found in FIG. 3 and its relevant descriptions.

It should be noted that the application scenario 100 is merely provided for illustrative purposes and is not intended to limit the scope of the present disclosure. For those of ordinary skill in the art, a plurality of modifications or variations can be made based on the description of the present disclosure. For example, the application scenario 100 may further include an information source. However, these variations and modifications will not depart from the scope of the present disclosure.

The Internet of Things system is an information processing system that includes some or all of the platforms in a user platform, a service platform, a management platform, a sensor network platform, and an object platform. The user platform is a dominator of the whole Internet of Things operation system, which can be configured to obtain user requirements. User requirements are the basis and prerequisite for the formation of the Internet of Things operation system, and the connection between all platforms of the Internet of Things system is to meet the user requirements. The service platform is a bridge located between the user platform and the management platform to achieve the connection between the user platform and the management platform, and the service platform may provide input and output services for the user. The management platform may realize the arrangement and coordination of the connection and collaboration between each functional platform (such as the user platform, the service platform, the sensor network platform, and the object platform). The management platform aggregates the information of Internet of Things operation system, and may provide perception management and control management functions for Internet of Things operation system. The sensor network platform may realize connecting the management platform and the object platform and plays the function of perception information sensing communication and control information sensing communication. The object platform is the functional platform for the generation of perception information and the execution of control information.

The processing of information in the Internet of Things system may be divided into the processing process of perception information and the processing process of control information, wherein the control information may be the information generated based on the perception information. The processing of perception information is that the object platform obtains the perception information and transmits it to the management platform through the sensor network platform, and the management platform transmits the calculated perception information to the service platform, and finally the perception information is transmitted to the user platform. The user generates control information after judging and analyzing the perception information. The control information is then generated by the user platform and sent to the service platform. The service platform then transmits the control information to the management platform. The management platform calculates and processes the control information, sends it to the object platform through the sensor network platform, and then realizes the control of the corresponding object.

In some embodiments, when the Internet of Things system is applied to traffic diversion management, it can be referred to as the Internet of Things system for traffic diversion management in a smart city.

Figure 2:
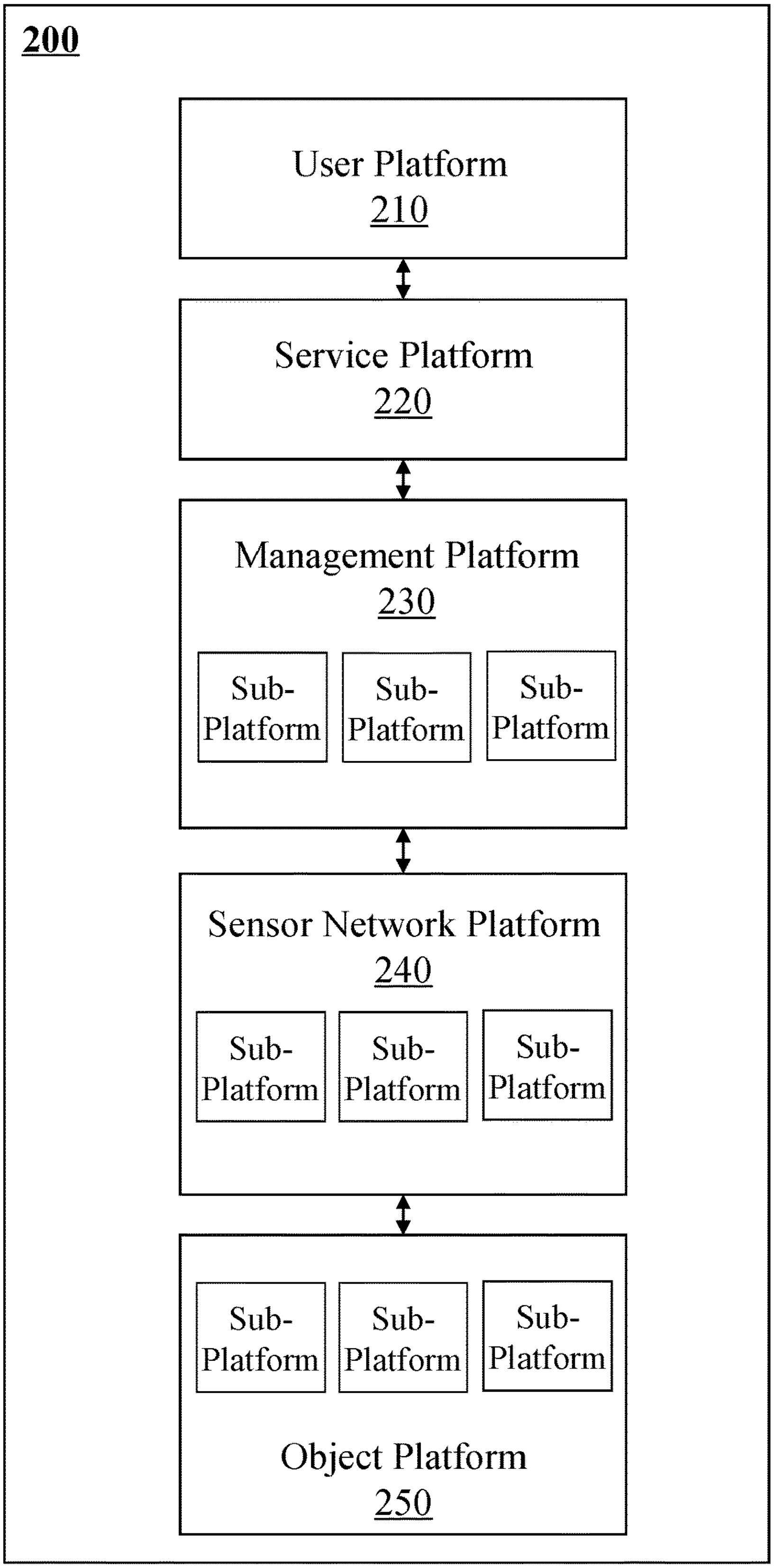
FIG. 2 is an exemplary block diagram illustrating the Internet of Things system for traffic diversion management in a smart city according to some embodiments of the present disclosure.

FIG. 2 is an exemplary block diagram illustrating the Internet of Things system for traffic diversion management in a smart city according to some embodiments of the present disclosure.

As shown in FIG. 2, an Internet of Things system 200 for traffic diversion management in a smart city may include a user platform 210, a service platform 220, a management platform 230, a sensor network platform 240, and an object platform 250. In some embodiments, the Internet of Things system 200 for traffic diversion management in a smart city may be part of or implemented by the server 110.

In some embodiments, the Internet of Things system for traffic diversion management in a smart city may be applied to a plurality of scenarios for traffic diversion management. In some embodiments, the Internet of Things system for traffic diversion management in a smart city may obtain the first traffic feature of the target road in the first time period from the object platform via the sensor network platform. In some embodiments, the Internet of Things system for traffic diversion management in a smart city may send the target tidal lane opening scheme to the object platform via the sensor network platform. The service platform is configured to send the target tidal lane opening scheme to the user platform, and the object platform is configured to control the target road based on the target tidal lane opening scheme.

A plurality of scenarios of traffic diversion management may include road traffic monitoring scenarios, tidal lane opening schemes, future time traffic flow prediction scenarios, etc. It should be noted that the above scenarios are merely examples and do not limit the specific application scenarios of the Internet of Things system for traffic diversion management in a smart city. A person skilled in the art may apply the Internet of Things system for traffic diversion management in a smart city to any other suitable scenarios based on the descriptions disclosed in this embodiment.

In some embodiments, the Internet of Things system for traffic diversion management in a smart city may be applied to road traffic monitoring scenarios. When applied to road traffic monitoring, the object platform may obtain the first traffic feature of the target road in the first time period, wherein the first traffic feature is a feature reflecting the flow situation of the target road.

In some embodiments, the Internet of Things system for traffic diversion management in a smart city may be applied to the tidal lane opening scenarios. For example, the sensor network platform sends the target tidal lane opening scheme to the object platform. The service platform is configured to send the target tidal lane opening scheme to the user platform. The object platform is configured to control the target road based on the target tidal lane opening scheme.

In some embodiments, the Internet of Things system for traffic diversion management in a smart city may be applied to t h e future time traffic flow prediction scenarios. For example, the management platform may determine the second traffic feature for a candidate tidal lane opening scheme at a second time period based on the first traffic feature.

The following will take the Internet of Things system for traffic diversion management in a smart city applied to the tidal lane opening scheme as an example to give a detailed description of the Internet of Things system for traffic diversion management in a smart city.

The user platform 210 may be a user-oriented service interface. In some embodiments, the user platform may be configured for the user to consult opening information of the tidal lane. In some embodiments, the user platform may receive user-initiated traffic diversion management tasks. In some embodiments, the user platform may receive various types of information input by the user. Exemplary information may include the user's travel information (e.g., origin, destination, travel time, travel mode, etc.), travel needs, etc. In some embodiments, the user platform may receive the target tidal lane opening scheme sent by the service platform and deliver it to the user in various ways. Exemplary ways may include text, voice, etc.

The service platform 220 may be a platform that performs initial processing of traffic diversion management tasks. In some embodiments, the service platform may transmit the traffic diversion management tasks to the management platform. In some embodiments, the service platform may deliver various types of information input by the user to the management platform. For example, the user's travel information, travel demand, etc., are transmitted to the management platform. In some embodiments, the service platform may be configured to send the target tidal lane opening scheme to the user platform.

The management platform 230 may refer to an Internet of Things platform that orchestrates and coordinates the connection and collaboration between each functional platform to provide perception management and control management. In some embodiments, the management platform may be configured as an independent structure. The independent structure means that the management platform uses different sub-platforms of the management platform (also referred to as management sub-platforms) to perform data storage, data processing, and/or data transmission on different data from t h e sensor network platform. For example, each management sub-platform may correspond to a sensor network sub-platform of the sensor network platform, and to an object sub-platform of the object platform.

In some embodiments, the management platform may obtain the first traffic feature of the target road in the first time period from the object platform via the sensor network platform. In some embodiments, the management platform may determine the target tidal lane opening scheme of the target road in the first time period based on the first traffic feature. In some embodiments, the management platform may send the target tidal lane opening scheme to the object platform via the sensor network platform.

In some embodiments, the management platform may also determine a plurality of candidate tidal lane opening schemes based on the first traffic feature. For each of a plurality of candidate tidal lane opening schemes, the management platform may determine the second traffic feature for the candidate tidal lane opening scheme in the second time period based on the first traffic feature, determine a second traffic feature from a plurality of candidate tidal lane opening schemes based on the second traffic feature corresponding to each of the plurality of candidate tidal lane opening schemes, and determine the target tidal lane opening scheme from a plurality of candidate tidal lane opening schemes based on the second traffic feature corresponding to each of the plurality of candidate tidal lane opening schemes.

The sensor network platform 240 may be a platform that realizes an interactive interface between the management platform and the object platform. In some embodiments, the sensor network platform includes at least one sensor network sub-platform. Each sensor network sub-platform in the at least one sensor network sub-platform corresponds to at least one object platform, and each sensor network sub-platform corresponds to at least one target road. In some embodiments, the sensor network platform may be configured to obtain the first traffic feature of the target road in the first time period from the object platform. In some embodiments, the sensor network platform may be configured as an independent structure. The independent structure means that the sensor network platform uses different sensor network sub-platforms to perform data storage, data processing, and/or data transmission on different data from the object platform. For example, each sensor network sub-platform may correspond to the object sub-platform of each object platform, and the sensor network platform may obtain the first traffic feature of the target road in the first time period uploaded by each object sub-platform and upload them to the sub-platform of the management platform.

The object platform 250 is a functional platform for the generation of perception information and the final execution of control information. In some embodiments, the object platform may be configured to control a target road based on the target tidal lane opening scheme. In some embodiments, the object platform may include a plurality of object sub-platforms, wherein different object sub-platforms may obtain the information of different target roads, respectively. In some embodiments, each object sub-platform may correspond to each sensor network sub-platform.

It is possible for a person skilled in the art, with an understanding of the principle of the system, to adapt the Internet of Things system for traffic diversion management in a smart city to any other suitable scenario without departing from this principle.

It should be noted that the above description of the system and its modules is for descriptive convenience only and does not limit the present disclosure to the scope of the embodiments cited. It can be understood that it is possible for a person skilled in the art, after understanding the principle of the system, to make any combination of the modules or form a subsystem to connect with other modules without departing from this principle. For example, the management platform and the service platform may be integrated into a single module. Another example is that each module may share a common storage device, or each module may have its own storage device. Variations such as these are within the scope of protection of the present disclosure.

Figure 3:
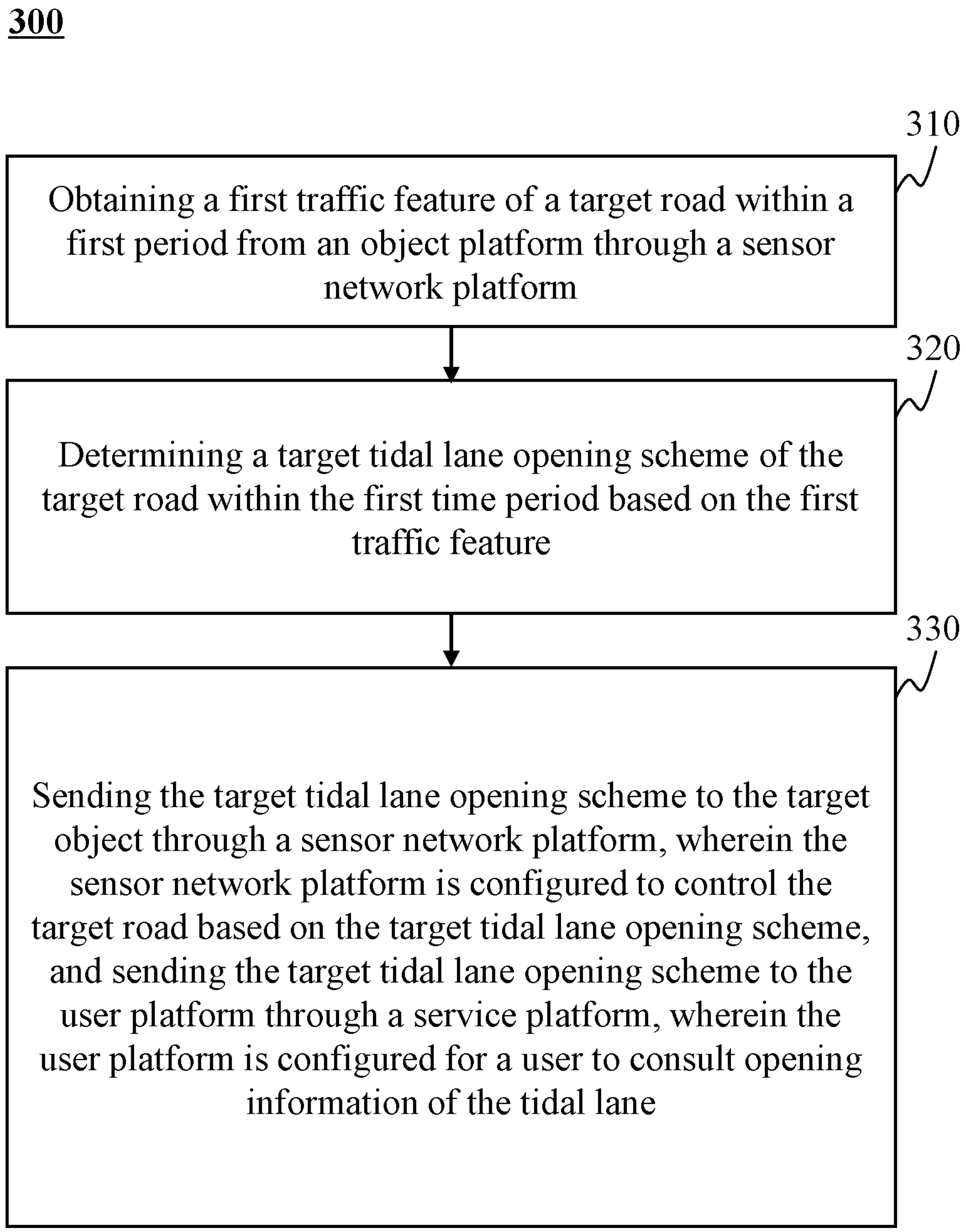
FIG. 3 is a flowchart illustrating an exemplary process for traffic diversion management in a smart city according to some embodiments of the present disclosure.

FIG. 3 is an exemplary flowchart illustrating a process for traffic diversion management in a smart city according to some embodiments of the present disclosure. In some embodiments, process 300 may be performed by a management platform. As shown in FIG. 3, the process 300 includes the following steps.

Step 310, obtaining the first traffic feature of the target road in the first time period from the object platform via the sensor network platform. The first traffic feature is a feature reflecting the flow situation of the target road.

The target road may be a road that requires traffic diversion management. For example, the target road may be a road arranged with a tidal lane. A tidal lane may be a reversible lane that changes the direction of vehicle movement in response to traffic flow demand. For example, a target road A, connecting a suburban area to an urban area, includes at least one tidal lane a, and a traveling direction of vehicles on the tidal lane a is from the suburban area to the urban area during the morning peak period while the traveling direction of vehicles on the tidal lane a is from the urban area to the suburban area during the evening peak period.

The first time period may be a time period during which traffic diversion management is performed. For example, the first time period may be a current time period. The first time period may be predetermined by the user, e.g., 06:00-06:30.

A first traffic feature may be a feature that reflects the flow situation on the target road during the first time period. In some embodiments, the first traffic feature includes a vehicle flow feature through the target road (e.g., a total number of vehicles, vehicle density of the target road, etc.). The first traffic feature may also include a traffic congestion feature of the target road (e.g., whether traffic is congested and the duration of traffic congestion). The management platform may obtain the first traffic feature from the road monitoring video in the object platform through the sensor network platform. For example, the management platform may obtain the road monitoring video of road A between 08:30-09:00 through the network, and recognize it to determine that the total number of vehicles passing road A at this time is 16, the average traffic density is 200 vehicles/km, and the traffic congestion lasts for 20 minutes.

Step 320, based on the first traffic feature, determining the target tidal lane opening scheme of the target road in the first time period. The target tidal lane opening scheme is a scheme for managing the opening times of the tidal lanes, the flow directions of the tidal lanes, and the number of the tidal lanes on the target road.

The target tidal lane opening scheme may be an opening scheme of the tidal lanes corresponding to the target road. In some embodiments, the target tidal lane opening scheme may include the opening times of the tidal lanes, the flow directions of the tidal lanes, and the number of the tidal lanes. The opening time may refer to the time when the tidal lanes are opened or changed. The flow direction of the lane may refer to the direction of vehicle movement in the tidal lane. The number of lanes may refer to the number of tidal lanes that are enabled. For example, the target tidal lane opening scheme may include enabling 2 lanes (lane a and lane b) of road A as tidal lanes with opening times of 18:00-23:00 and flow direction of the lanes to the south. In some embodiments, the target tidal lane opening scheme may include not opening tidal lane, i.e., the opening time of the tidal lane in the target tidal lane opening scheme is none, or the number of lanes is zero.

In some embodiments, the management platform may determine the target tidal lane opening scheme for the target road in the first time period based on the first traffic feature through a predetermined relationship between the first traffic feature and the tidal lane opening scheme. For example, different first traffic features may correspond to different tidal lane opening schemes, and when the traffic flow of the southward lane in the first traffic feature is greater, the tidal lane opening scheme with a greater number of southward lanes may be selected as the target tidal lane opening scheme according to the above-predetermined relationship.

In some embodiments, the management platform may determine a plurality of candidate tidal lane opening schemes based on the first traffic feature, for each of a plurality of candidate tidal lane opening schemes, determine the second traffic feature for the candidate tidal lane opening scheme in the second time period based on the first traffic feature, and determine a target tidal lane opening scheme from a plurality of candidate tidal lane opening schemes based on the second traffic feature corresponding to each of a plurality of candidate tidal lane opening schemes. More descriptions regarding the above embodiments may be found in FIG. 4 and its relevant descriptions.

In some embodiments, the management platform may determine the target tidal lane opening scheme from a plurality of candidate tidal lane opening schemes via a genetic algorithm based on the first traffic feature. More descriptions regarding the genetic algorithm may be found in FIG. 7 and the relevant descriptions.

Step 330, sending the target tidal lane opening scheme platform to the object platform via the sensor network platform, wherein the object platform is configured to control the target road based on the target tidal lane opening scheme, and sending the target tidal lane opening scheme to the user platform via the service platform, wherein the user platform is configured for the user to consult the opening information of the tidal lane.

The object platform may change the relative information of the target road to conform to the target tidal lane opening scheme. For example, the controlling the target road by the object platform may include making changes to the traveling direction sign for the tidal lane, sending a tidal lane notification to the vehicle radio, and controlling the removable barrier to change a lane. The user platform may be configured for the user to consult the opening information of the tidal lane. The exemplary opening information of the tidal lane may include the opening times of the tidal lanes, the flow directions of the tidal lanes, the number of the tidal lanes, etc.

In some embodiments of the present disclosure, determining the target tidal lane opening scheme for the target road in the first time period based on the first traffic feature may achieve intelligent control of the opening times of the tidal lanes, the flow directions of the tidal lanes, and the number of the tidal lanes based on road conditions, which c a n improve the matching degree between the target tidal lane opening scheme and the actual traffic conditions.

It should be noted that the above description of process 300 is for example and illustration purposes only and does not limit the scope of application of the present disclosure. For those skilled in the art, various modifications and changes can be made to the process 300 under the guidance of the present disclosure. However, these modifications and changes remain within the scope of the present disclosure.

Figure 4:
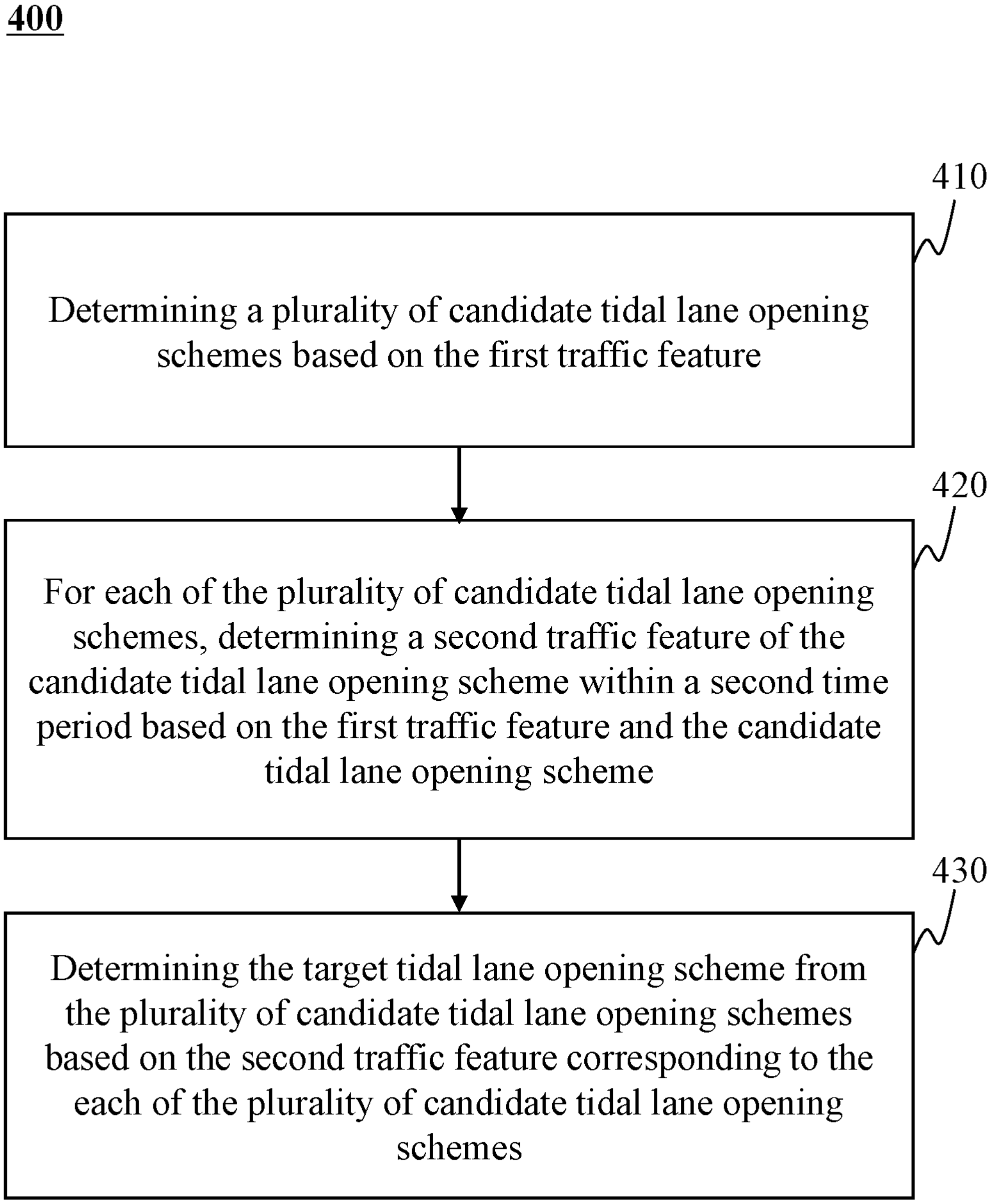
FIG. 4 is a flowchart illustrating an exemplary process for determining a target tidal lane opening scheme according to some embodiments of the present disclosure.

FIG. 4 is a flowchart illustrating an exemplary process for determining a target tidal lane opening scheme according to some embodiments of the present disclosure. In some embodiments, process 400 may be performed by a management platform. As shown in FIG. 4, the process 400 includes the following steps.

Step 410, based on the first traffic feature, recognizing a plurality of candidate tidal lane opening schemes.

A candidate tidal lane opening scheme is a tidal lane opening scheme that may be selected as the target tidal lane opening scheme. The candidate tidal lane opening scheme may include the opening times of the tidal lanes, the flow directions of the tidal lanes and the number of the tidal lanes. For example, candidate tidal lane opening schemes for road A may include a candidate tidal lane opening scheme 1, a candidate tidal lane opening scheme 2, and a candidate tidal lane opening scheme 3, wherein the candidate tidal lane opening scheme 1 includes changing the flow direction of the lane a to south during 18:00 to 23:00. The candidate tidal lane opening scheme 2 includes changing the flow direction of the lane a to south from 19:00 to 23:00. The candidate tidal lane opening scheme 3 includes changing the flow direction of the lane b to south during 18:00-23:00.

In some embodiments, the management platform may determine whether traffic is congested based on the first traffic feature. In response to the traffic congestion, the management platform may enumerate all candidate opening schemes for the target road to obtain a plurality of candidate tidal lane opening schemes. For example, when the number of vehicles in the first traffic feature exceeds a number threshold and the vehicle density exceeds a density threshold, the traffic congestion is judged and the management platform may perform enumeration. For example, the considered time period is 18:00-19:00, and the road A has 4 lanes (a, b, c and d), wherein lanes a and b are oriented to the north and lanes c and d are oriented to the south. If at most one tidal lane is arranged, all the candidate tidal lane opening schemes are enumerated as follows: the candidate tidal lane opening scheme 1 includes changing the flow direction of the lane a to south at 18:00-19:00, the candidate tidal lane opening scheme 2 includes changing the flow direction of the lane b to south at 18:00-19:00, the candidate tidal lane opening scheme 3 includes changing the flow direction of the lane c to north at 18:00-19:00, and the candidate tidal lane opening scheme 4 includes changing the flow direction of the lane d to north at 18:00-19:00. The number threshold and density threshold may be determined based on manual setting, and the changes of flow direction of the lane may have a minimum time interval (e.g., one hour) to avoid frequent changes of flow direction causing traffic congestion. In some embodiments, an enumeration process may set a filtering term. For example, when the target road includes only two lanes in opposite directions, the target road is filtered and no enumeration is needed; when the target road includes four lanes (such as the lane a, lane b, lane c, and lane d), the lanes near the outside of the road (such as the lane a, lane d) of the four lanes are filtered and no enumeration is performed on them. Setting the filtering term can avoid enumerating lanes that cannot be used as tidal lanes, thereby reducing computation.

In some embodiments, a plurality of candidate tidal lane opening schemes may be determined from the historical tidal lane opening schemes of the target road based on the comparison of the first traffic feature with the historical traffic feature. For example, the management platform may compare the first traffic feature with the historical traffic feature stored in the database to determine a plurality of historical tidal lane opening schemes in which the similarity between the first traffic feature and the historical traffic feature is greater than the similarity threshold as a plurality of candidate tidal lane opening schemes. The similarity threshold may be determined based on the manual setting.

Step 420, for each of a plurality of candidate tidal lane opening schemes, determining the second traffic feature for the candidate tidal lane opening scheme in the second time period based on the first traffic feature and the candidate tidal lane opening schemes.

The second time period is a time period after the traffic diversion management is performed. For example, the second time period may be a time period in the future. The second time period may be a time period preset by the user, e.g., 1 hour after the tidal lane opening scheme is enabled.

The second traffic feature is a feature that reflects the expected traffic flow on the target road during the second time period. In some embodiments, the second traffic feature may include a feature of the traffic flow through the target road during the second time period (e.g., a total number of expected vehicles, a vehicle density of expected target road, etc.). In some embodiments, the second traffic feature may further include the expected traffic congestion feature of the target road (e.g., the road expected to be congested and the expected duration of the traffic congestion).

In some embodiments, the management platform may determine, based on the first traffic feature and the candidate tidal lane opening schemes, the second traffic feature by fitting, artificial intelligence, etc.

In some embodiments, the management platform may determine the second traffic feature through a machine learning model based on the first traffic feature and the candidate tidal lane opening schemes.

In some embodiments, for each of a plurality of candidate tidal lane opening schemes, the management platform may process the graph structure data and the candidate tidal lane opening schemes based on a traffic prediction model to determine the second traffic feature. The graph structure data may be constructed based on the first traffic feature. More about the traffic prediction model and the graph structure data may be found in FIG. 5 and its related contents. More descriptions regarding the traffic prediction model and the graph structure data may be found in FIG. 5 and the relevant descriptions.

Step 430, determining a target tidal lane opening scheme from a plurality of candidate tidal lane opening schemes based on a second traffic feature corresponding to each of a plurality of candidate tidal lane opening schemes.

In some embodiments, the management platform may determine a target tidal lane opening scheme from a plurality of candidate tidal lane opening schemes based on a plurality of methods. For example, a candidate tidal lane opening schemes with the shortest duration of traffic congestion corresponding to the target road in the second traffic feature may be used as the target tidal lane opening scheme.

In some embodiments, the management platform may also determine, for each of a plurality candidate tidal lane opening schemes, a traffic improvement value for the candidate tidal lane opening scheme based on the first traffic feature and the second traffic feature corresponding to the candidate tidal lane opening scheme, and determine, based on the traffic improvement value corresponding to each of a plurality of candidate tidal lane opening schemes, the target tidal lane opening scheme from a plurality of candidate tidal lane opening schemes. More descriptions regarding the traffic prediction model and the traffic improvement value may be found in FIG. 6 and the relevant descriptions.

In some embodiments of the present disclosure, the management platform may predict a future second traffic feature and determine the target tidal lane opening scheme based on the current first traffic feature and the candidate tidal lane opening schemes, so that a tidal lane opening scheme that is more consistent with the actual traffic conditions can be obtained, which is conducive to improving the quality of traffic diversion management.

Figure 5:
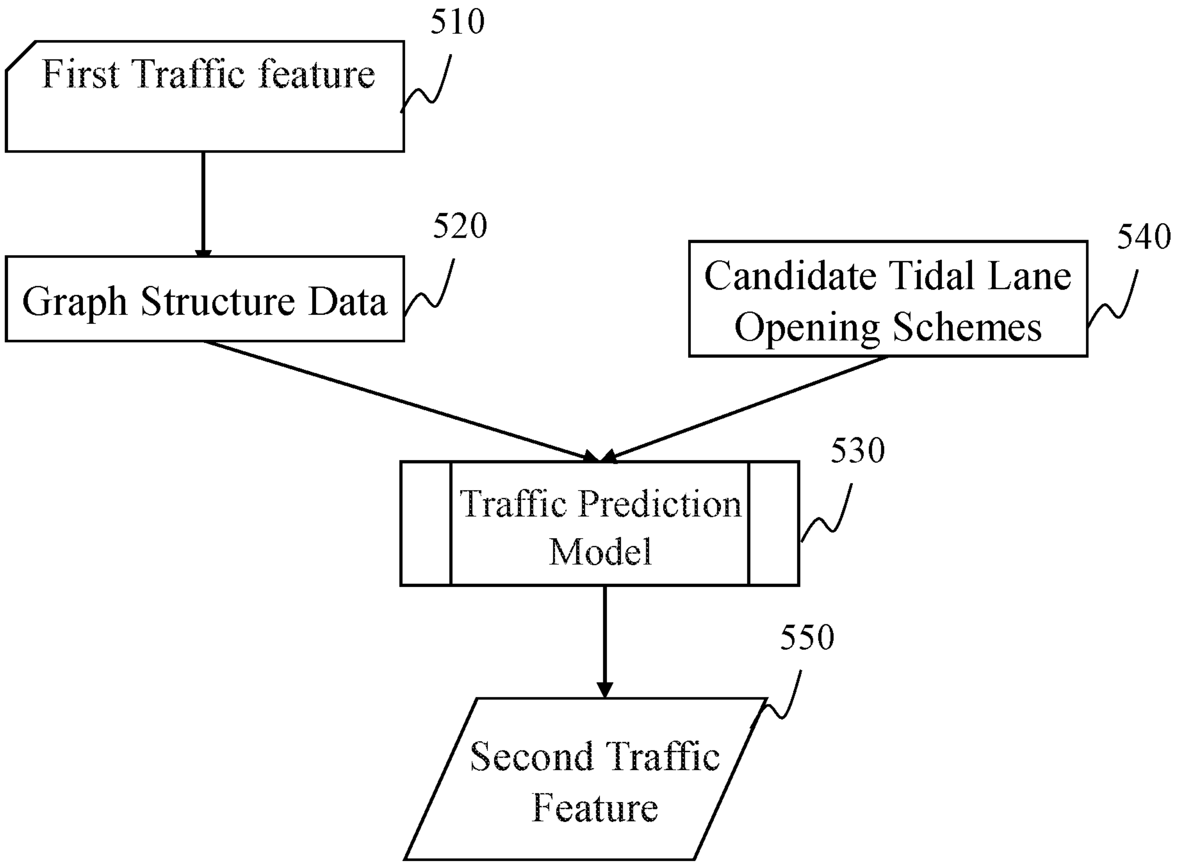
FIG. 5 is a schematic diagram illustrating a process for determining the second traffic feature based on a traffic prediction model according to some embodiments of the present disclosure.

FIG. 5 is a schematic diagram illustrating a process for determining the second traffic feature based on a traffic prediction model according to some embodiments of the present disclosure.

As shown in FIG. 5, the management platform may process graph structure data 520 and a candidate tidal lane opening scheme 540 to determine a second traffic feature 550 based on traffic prediction model 530, wherein the graph structure data 520 may be constructed based on a first traffic feature 510.

The graph structure data 520 is the data that reflects the condition of the target road and has a form of a graph structure. In some embodiments, the graph structure data may include intersection nodes and edges, the edges may connect intersection nodes, and the target road may correspond to a plurality of intersection nodes and a plurality of edges. The intersection nodes and edges may have attributes.

An intersection node may refer to an intersection contained in the target road, and the attribute of the intersection node may reflect the relevant feature corresponding to the intersection. The attributes of the intersection node may include a traffic flow feature of the intersection node, traffic congestion feature of the intersection node, etc. The attributes of the above node may be determined by the first traffic feature. In some embodiments, the attributes of the intersection node may also include the number of edges that are connected to the intersection node and the weather. The number of edges and the weather may be determined in a plurality of manners, for example, through a network.

The edge may refer to a road between the interactions, and the attributes of the edge may reflect the relevant feature of the road. The attributes of the edge may include the traffic flow feature of the edge, the traffic congestion feature of the edge, etc. The above attributes of the edge may be determined by the first traffic feature. In some embodiments, the attributes of the edge may further include the road feature corresponding to the edge. More descriptions regarding the road feature may be found in FIG. 6 and the relevant descriptions. In some embodiments, the edge may be a directed edge whose direction is the direction in which the vehicle is traveling on the road. In some embodiments, the attributes of the edge may also include the feature of a proportion of a vehicle subscribed the tidal lane notification of vehicles to the vehicles passing the road. For example, the management platform may determine that 60% of vehicles are subscribed to tidal lane notification based on subscription data from vehicle radios. The proportion of vehicles subscribed to the tidal lane notification may be obtained based on the network.

The traffic prediction model 530 may be configured to predict the second traffic feature corresponding to the second time period. The traffic prediction model 530 may include a graph neural network model, etc.

In some embodiments, the input of the traffic prediction model 530 may be the graph structure data 520 and the candidate tidal lane opening scheme 540. The output of the traffic prediction model 530 may be the second traffic feature 550 corresponding to the candidate tidal lane opening scheme in the second time period, wherein the candidate tidal lane opening scheme 540 may be any one of a plurality of candidate tidal lane opening schemes.

In some embodiments, a traffic prediction model may be trained based on a large number of training samples with labels. Specifically, the marked training samples are input into an initial traffic prediction model and the parameters of the traffic prediction model are updated through training. In some embodiments, the training samples may be the historical graph structure data and the historical tidal lane opening schemes. In some embodiments, a label may be a second traffic feature corresponding to a historical candidate tidal lane opening scheme. In some embodiments, the methods of obtaining the training samples and the labels may be obtained based on historical records of the management platform. For example, the training may be performed based on a gradient descent method. In some embodiments, the training may end when a predetermined condition is satisfied, and a trained traffic prediction model is obtained. The predetermined condition may be the convergence of a loss function.

In some embodiments of the present disclosure, the graph structure data may be processed based on the traffic prediction model to realize the prediction of the future traffic feature of a plurality of candidate tidal lane opening schemes, thereby facilitating the selection of the optimal scheme that is suitable for the current target road from a plurality of candidate tidal lane opening schemes. And using a graph neural network can improve the accuracy of the prediction of the second traffic feature corresponding to a plurality of candidate tidal lane opening schemes.

Figure 6:
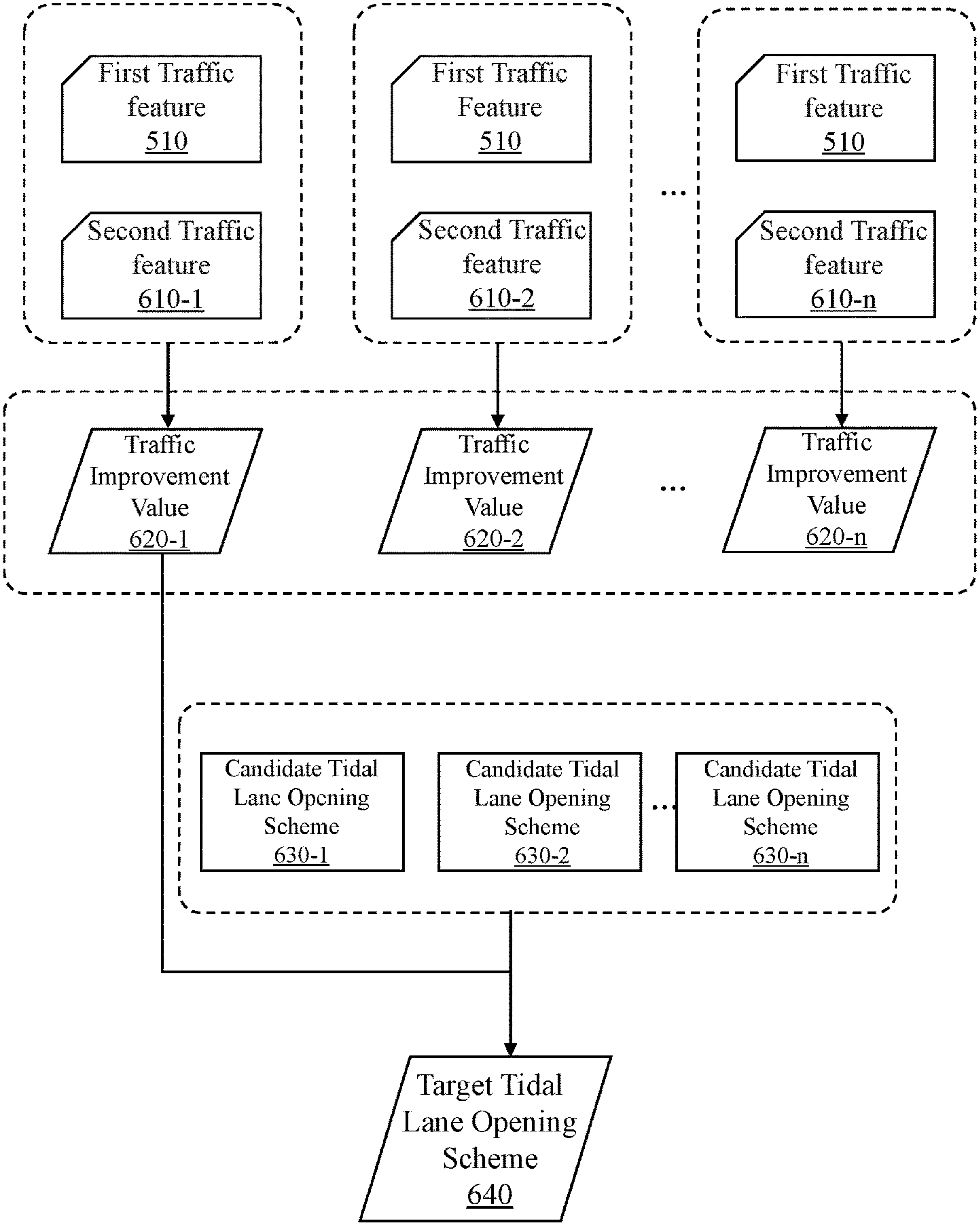
FIG. 6 is a schematic diagram illustrating a process for determining the target tidal lane opening scheme based on the traffic improvement value according to some embodiments of the present disclosure.

FIG. 6 is a schematic diagram illustrating a process for determining the target tidal lane opening scheme based on the traffic improvement value according to some embodiments of the present disclosure.

As shown in FIG. 6, for each of a plurality of candidate tidal lane opening schemes, the management platform may determine the traffic improvement value of each candidate tidal lane opening scheme based on the first traffic feature 510 and the corresponding second traffic feature of each candidate tidal lane opening scheme. The management platform may determine a traffic improvement value 620-1 corresponding to the candidate tidal lane opening scheme 1, a traffic improvement value 620-2 corresponding to the candidate tidal lane opening scheme 2 . . . and a traffic improvement value **620-*n* corresponding to the candidate tidal lane opening scheme n based on the first traffic feature 510 and a second traffic feature 610-1 corresponding to the candidate tidal lane opening scheme 1 (630-1), a second traffic feature 610-2 corresponding to the candidate tidal lane opening scheme 2 (630-2), and a candidate second traffic feature 610-*n* corresponding to the candidate tidal lane opening scheme n (630-*n***). The traffic improvement value may reflect the traffic improvement degree brought by performing the candidate tidal lane opening scheme. In some embodiments, the traffic improvement value may be represented by real numbers between 0-100. The higher the traffic improvement value, the higher the traffic smooth degree brought by performing the candidate tidal lane opening schemes.

In some embodiments, for each candidate tidal lane opening scheme, the management platform may determine the traffic improvement value corresponding to the candidate tidal lane opening scheme based on the first traffic feature and the second traffic feature in a plurality of manners. In some embodiments, for each candidate tidal lane opening scheme, the management platform may compare the first traffic feature with the second traffic feature to determine the traffic improvement value corresponding to the candidate tidal lane opening scheme based on the comparison result. Merely by way of example, if there are 5 roads blocked in the first time period, after performing the candidate tidal lane opening scheme 1, two roads are predicted to be blocked. It means the candidate tidal lane opening scheme improves traffic on 3 roads, i.e., 60% of the roads, and the corresponding traffic improvement value is 60. After implementing the candidate tidal lane opening scheme 2, only one road is predicted to be blocked. It means the candidate tidal lane opening scheme improves traffic on 4 roads, i.e., 80% of the roads, and the corresponding traffic improvement value is 80.

In some embodiments, the traffic improvement value may also be related to the road feature of the target road. The road feature of the target road may be relevant feature of the road. In some embodiments, the road feature of the target road may include at least features of the number of the lanes for the target road, the width of the lanes, and the flow direction of the lanes. For example, in the first time period, there are two roads A and B both with traffic congestion, wherein the road A has more lanes and greater width of lanes than those of the road B. After implementing the tidal lane opening scheme, if both roads A and B become uncongested, the road A, which has more lanes and greater width of lanes than the road B, has a greater traffic improvement value than the road B. For another example, a ratio of the number of lanes and a ratio of the width of lanes of the above roads A and B may be used as the traffic improvement values of the above roads A and B, respectively.

The set traffic improvement value can quantify an improvement degree to traffic conditions by the tidal lane, and the traffic improvement value is related to the road feature of the target road, which can make the determined target tidal lane opening scheme more optimal.

In some embodiments, the management platform may determine a target tidal lane opening scheme from a plurality of candidate tidal lane opening schemes based on the traffic improvement value corresponding to each of a plurality of candidate tidal lane opening schemes. As shown in FIG. 6, the management platform may determine the greatest traffic improvement value from the traffic improvement value 620-1, the traffic improvement value 620-2, and the traffic improvement value **620-*n*, and determine the candidate tidal lane opening scheme corresponding to the above maximum traffic improvement value as the target tidal lane opening scheme 640** from the candidate tidal lane opening scheme 1, the candidate tidal lane opening scheme 2 . . . and the candidate tidal lane opening scheme n.

In some embodiments of the present disclosure, the target tidal lane opening scheme is determined based on the traffic improvement value, which makes the obtained scheme most conducive to improving the traffic conditions, thereby improving the quality of traffic diversion management.

Figure 7:
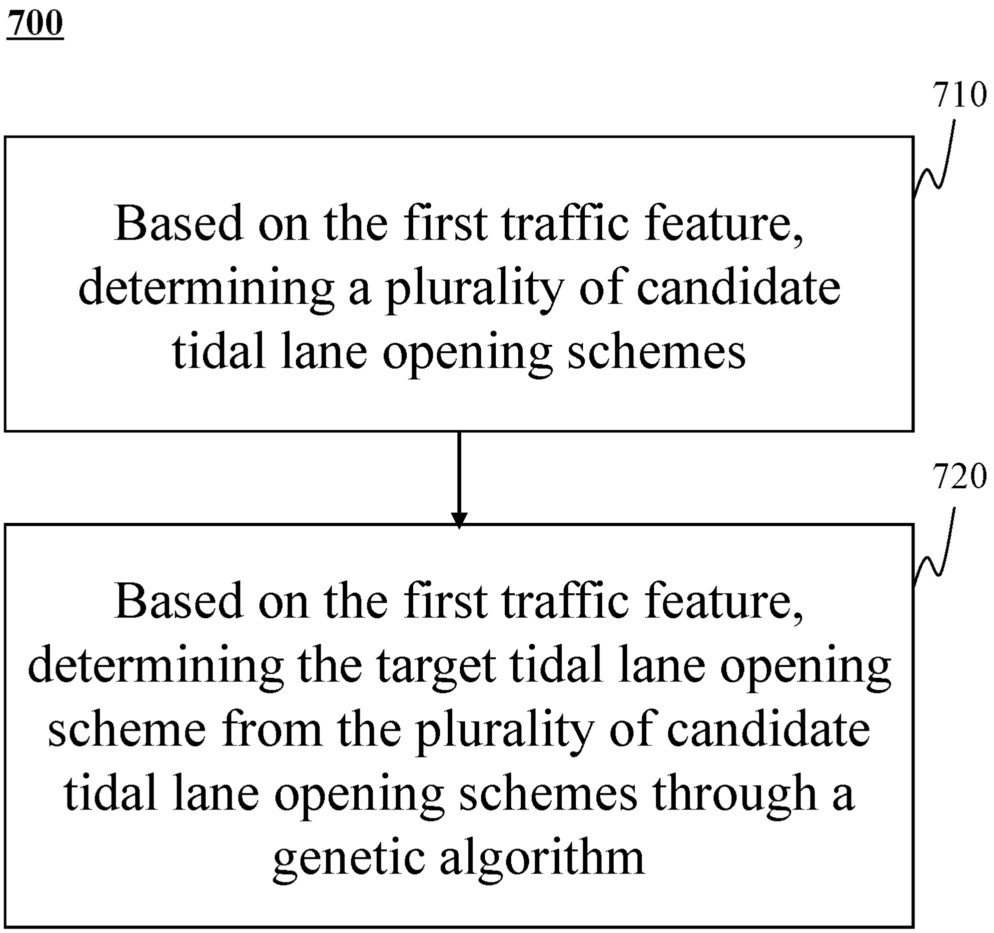
FIG. 7 is an exemplary flowchart illustrating an exemplary process for determining the target tidal lane opening scheme based on a genetic algorithm according to some embodiments of the present disclosure.

FIG. 7 is an exemplary flowchart illustrating an exemplary process for determining the target tidal lane opening schemes based on a genetic algorithm according to some embodiments of the present disclosure. In some embodiments, process 700 may be performed by the management platform. As shown in FIG. 7, process 700 includes the following steps.

Step 710, based on the first traffic feature, determining the plurality of candidate tidal lane opening schemes.

The specific descriptions of Step 710 may be found in FIG. 3 and the relevant descriptions.

Step 720, based on the first traffic feature, determining the target tidal lane opening scheme from a plurality of candidate tidal lane opening schemes through a genetic algorithm.

The genetic algorithm may include a coding operation, a n initial coding setting, a fitness function establishment, and a plurality of iteration processes, wherein the algorithm is completed when the fitness of the encoding exceeds a threshold, or the number of iterations reaches a preset value, and the candidate tidal lane opening scheme corresponding to the encoding with the highest fitness is obtained as the target tidal lane opening scheme. One iteration process of the genetic algorithm includes a crossover operation, a mutation operation, a selection operation, and an update operation.

In some embodiments, the management platform may perform an encoding operation. The encoding operation means that a plurality of candidate tidal lane opening schemes are encoded respectively to obtain a candidate encoding corresponding to each encoded candidate tidal lane opening scheme. A plurality of candidate encodings may constitute an encoding set. In some embodiments, an opening tidal lane is encoded with 1 and a non-opening tidal lane is encoded with 0. For example, if there are five tidal lanes a, b, c, d and e on the target road, encoding 01101 indicates that tidal lanes a and d are not opened, and tidal lanes b, c and e are opened.

In some embodiments, the management platform may perform the initial coding setting. The operation of the initial encoding setting may include setting an initial encoding and a genetic algorithm end condition. The operation of the initial encoding setting may include setting a value of the initial encoding and setting a number of initial encodings. The operation of the initial encoding setting may include randomly generating an initial encoding or take a candidate encoding as an initial encoding. The genetic algorithm end condition may be that a fitness function value is higher than a preset threshold, a fitness difference between a plurality of times of successive iterations is lower than the preset difference threshold, and a preset maximum number of iterations has been reached, etc.

In some embodiments, the management platform may construct a fitness function. In some embodiments, the fitness function may be determined based on the traffic improvement value. The fitness degree (or fitness) may be the degree of fitness of a candidate tidal lane opening scheme as the target tidal lane opening scheme. The fitness degree reflects a comprehensive influence of traffic congestion on each road throughout the area after applying the scheme. The higher the fitness degree, the lower the comprehensive influence of traffic congestion on the roads in the area, and the more suitable the scheme is for the traffic conditions. In some embodiments, the fitness degree may be a traffic improvement value or positively correlated with the traffic improvement value. More descriptions regarding the determination of a traffic improvement value related to a candidate tidal lane opening scheme may be found in FIG. 3 and the relevant descriptions.

In some embodiments, the encoding operation, initial encoding setting, and fitness function establishment may be performed simultaneously or separately.

In some embodiments, the management platform may perform a crossover operation.

The crossover operation may refer to a crossover operator performing the crossover operation on at least two encodings of the candidate encodings corresponding to encoded candidate tidal lane opening schemes to obtain at least one crossover encoding. For example, the third position encodings of the candidate codes 01101 and 11001 are randomly selected for exchange to obtain two crossover encodings, 01001 and 11101.

In some embodiments, the management platform may also perform a mutation operation. The mutation operation may refer to the mutation operator performing mutation operation on at least one candidate encoding to obtain at least one mutation encoding. For example, a mutation operation is performed on the second and third positions on the candidate encoding 10101, wherein 1 becomes 0, and 0 becomes 1, then the mutation encoding is determined as 11001. In some embodiments, the mutation probability of each binary bit in the candidate encodings mutating from 0 to 1 is related to the proportion of vehicles subscribing to tidal lane notifications in the vehicles passing through the road corresponding to the binary bit. The vehicles subscribing to tidal lane notifications are more likely to enter the tidal lane. Therefore, a road with a greater proportion is more likely to open the tidal lane, thereby making the probability of changing from 0 to 1 greater for the road with a greater proportion.

In some embodiments, the crossover operation, and the mutation operation may be performed simultaneously or separately.

In some embodiments, the management platform may further perform an option operation. The option operation may refer to using the selection operator to select first several cross-encodings or mutation encodings with the relatively large fitness as a new encoding set.

In some embodiments, the management platform may further perform the update operation. The update operation may refer to putting the cross-encoding or mutation encoding obtained by the crossover operation or mutation operation into an original encoding set, and the schemes corresponding to encodings with poor fitness are removed.

In some embodiments, the update operations may also include a step of judging whether the iteration satisfies an end condition of the genetic algorithm. For example, the end condition of the genetic algorithm may be configured to judge that the fitness of a certain encoding is greater than a threshold, and the count of iterations is greater than a threshold, etc. In some embodiments, in response to the iteration satisfying the end condition of the genetic algorithm, the genetic algorithm is ended, the encoding with the highest fitness is output, and the scheme corresponding to the encoding with the highest fitness is the target tidal lane opening scheme. In some embodiments, in response to the iteration not satisfying the end condition of the genetic algorithm, the iteration is processed again.

In some embodiments of the present disclosure, the tidal lane opening scheme may be determined based on the plurality of candidate tidal lane opening schemes through a genetic algorithm, and the scheme may be selected based on the fitness, so that a comprehensive influence of traffic congestions on each road in the entire area can be minimized, thereby further improving the quality of the traffic diversion management.

According to one or more embodiments of the present disclosure, a non-transitory computer-readable storage medium is provided, and a computer program is stored on the storage medium, wherein the computer, after reading the program, executes the method for traffic diversion management in a smart city.

Some embodiments of the present disclosure provide a computer-readable storage medium, which storage medium storing computer instruction. When the computer reads the computer instruction in the storage medium, the computer executes the method described.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A method for tidal lane opening management in a smart city, which is applied to a management platform, comprising:

issuing a data obtaining instruction to a sensor network platform to obtain a first traffic feature of a target road within a first time period from an object platform through the sensor network platform, wherein the first traffic feature is a feature reflecting a flow situation of the target road;

determining a target tidal lane opening scheme of the target road within the first time period based on the first traffic feature using a preset algorithm, wherein the target tidal lane opening scheme is a scheme for managing an opening time of a tidal lane, a flow direction of the tidal lane, and a number of tidal lanes for the target road;

generating a scheme execution instruction based on the target tidal lane opening scheme, sending the scheme execution instruction to the object platform through the sensor network platform, the object platform configured to control the target road based on the scheme execution instruction; and issuing a data upload instruction to send the target tidal lane opening scheme to a user platform through a service platform, the user platform configured for a user to consult opening information of the tidal lane.

2. The method of claim 1, wherein the sensor network platform includes at least one sensor network sub-platform, and each sensor network sub-platform of the at least one sensor network sub-platform corresponds to at least one object platform, each sensor network sub-platform corresponds to at least one target road.

3. The method of claim 1, wherein the determining the target tidal lane opening scheme of the target road within the first time period based on the first traffic feature includes:

determining a plurality of candidate tidal lane opening schemes based on the first traffic feature;

for each of the plurality of candidate tidal lane opening schemes, determining a second traffic feature of the candidate tidal lane opening scheme within a second time period based on the first traffic feature and the candidate tidal lane opening scheme; and determining the target tidal lane opening scheme from the plurality of candidate tidal lane opening schemes based on the second traffic feature corresponding to the each of the plurality of candidate tidal lane opening schemes.

4. The method of claim 3, wherein the determining a second traffic feature of the candidate tidal lane opening scheme within a second time period based on the first traffic feature and the candidate tidal lane opening scheme for each of the plurality of candidate tidal lane opening schemes includes:

constructing graph structure data based on the first traffic feature; and processing the graph structure data and the candidate tidal lane opening scheme based on a traffic prediction model to determine the second traffic feature of the candidate tidal lane opening scheme within the second time period, wherein the traffic prediction model is a graph neural network model.

5. The method of claim 4, wherein the graph structure data includes intersection nodes and edges; the intersection nodes refer to intersections contained in the target road; attributes of the intersection nodes include a traffic flow feature of the intersections, a traffic congestion feature of the intersections, a number of edges that are connected to the intersection nodes, and weather; the edges refer to roads between the intersections, and attributes of the edges include a traffic flow feature of the edges, a traffic congestion feature of the edges, a road feature corresponding to the edges, a feature of a proportion of vehicles subscribing to a tidal lane notification to vehicles passing the roads in a vehicle flow; and the traffic flow feature and the traffic congestion feature of the edges and the intersection nodes are determined by the first traffic feature.

6. The method of claim 3, wherein the determining the target tidal lane opening scheme from the plurality of candidate tidal lane opening schemes based on the second traffic feature corresponding to the each of the plurality of candidate tidal lane opening schemes includes:

for each of the plurality of candidate tidal lane opening schemes, determining a traffic improvement value of the candidate tidal lane opening scheme based on the first traffic feature and the second traffic feature corresponding to the candidate tidal lane opening scheme; and determining the target tidal lane opening scheme from the plurality of candidate tidal lane opening schemes based on the traffic improvement value corresponding to the each of the plurality of candidate tidal lane opening schemes.

7. The method of claim 6, wherein the traffic improvement value reflects a degree of traffic improvement brought by implementing the candidate tidal lane opening scheme; the traffic improvement value is related to a road feature of the target road; and the road feature of the target road at least includes features of the number of lanes of the target road, widths of the lanes of the target road, and directions of the lanes of the target road.

8. The method of claim 1, wherein the determining the target tidal lane opening scheme of the target road within the first time period based on the first traffic feature includes:

based on the first traffic feature, determining a plurality of candidate tidal lane opening schemes; and based on the first traffic feature, determining the target tidal lane opening scheme from the plurality of candidate tidal lane opening schemes through a genetic algorithm.

9. The method of claim 8, wherein the genetic algorithm includes a coding operation, an initial coding setting, a fitness function establishment, and a plurality of iteration processes, when a fitness of coding exceeds a threshold or a number of iteration processes reaches a preset value, the genetic algorithm is completed, a candidate tidal lane opening scheme corresponding to coding with a highest fitness is used as the target tidal lane opening scheme; and the fitness reflects a comprehensive impact of traffic congestion on all roads in an entire region after applying a certain candidate tidal lane opening scheme.

10. The method of claim 9, wherein the fitness is determined based on a traffic improvement value.

11. The method of claim 9, wherein an iteration process of the genetic algorithm comprises a crossover operation, a mutation operation, a selection operation, and an update operation;

the mutation operation refers to performing the mutation operation on at least one candidate code corresponding to each candidate tidal lane opening scheme after the coding operation to obtain at least one mutation code; a mutation probability of each binary bit in the candidate code mutating from 0 to 1 is related to a proportion of vehicles subscribing to a tidal lane notification in a traffic flow of a road corresponding to the binary bit.

12. An Internet of Things system for tidal lane opening management in a smart city, wherein the Internet of Things system comprises a user platform, a service platform, a management platform, a sensor network platform, and an object platform;

the sensor network platform is configured to obtain a first traffic feature of a target road within a first time period from the object platform through the sensor network platform based on a data obtaining instruction, wherein the first traffic feature is a feature reflecting a flow situation of the target road;

the management platform is configured to determine a target tidal lane opening scheme of the target road within the first time period based on the first traffic feature using a preset algorithm, wherein the target tidal lane opening scheme is a scheme for managing an opening time of a tidal lane, a flow direction of the tidal lane, and a number of tidal lanes for the target road;

the service platform is configured to send the target tidal lane opening scheme to the user platform based on a data upload instruction;

the object platform is configured to generate a scheme execution instruction based on the target tidal lane opening scheme and control the target road based on the scheme execution instruction; and the user platform is configured for a user to consult opening information of the tidal lane.

13. The Internet of Things system of claim 12, wherein the management platform is further configured to:

determine a plurality of candidate tidal lane opening schemes based on the first traffic feature;

for each of the plurality of candidate tidal lane opening schemes, determine a second traffic feature of the candidate tidal lane opening scheme based on the first traffic feature and the candidate tidal lane opening scheme; and determine the target tidal lane opening scheme from the plurality of candidate tidal lane opening schemes based on the second traffic feature corresponding to each of the plurality of candidate tidal lane opening schemes.

14. The Internet of Things system of claim 13, wherein the management platform is further configured to:

construct graph structure data based on the first traffic feature; and process the graph structure data and the candidate tidal lane opening scheme based on a traffic prediction model to determine the second traffic feature of the candidate tidal lane opening scheme within the second time period, wherein the traffic prediction model is a graph neural network model.

15. The Internet of Things system of claim 14, wherein the graph structure data includes intersection nodes and edges; the intersection nodes refer to intersections contained in the target road; attributes of the intersection nodes include a traffic flow feature of the intersections, a traffic congestion feature of the intersections, a number of edges that are connected to the intersection nodes, and weather; the edges refer to roads between the intersections, and attributes of the edges include a traffic flow feature of the edges, a traffic congestion feature of the edges, a road feature corresponding to the edges, a feature of a proportion of vehicles subscribing to a tidal lane notification to vehicles passing the roads in a vehicle flow; and the traffic flow feature and the traffic congestion feature of the edges and the intersection nodes are determined by the first traffic feature.

16. The Internet of Things system of claim 13, wherein the management platform is further configured to:

for the each of the plurality of candidate tidal lane opening schemes, determine a traffic improvement value of the candidate tidal lane opening scheme based on the first traffic feature and the second traffic feature corresponding to the candidate tidal lane opening scheme; and determine the target tidal lane opening scheme from the plurality of candidate tidal lane opening schemes based on the traffic improvement value corresponding to each of the plurality of candidate tidal road opening schemes.

17. The Internet of Things system of claim 16, wherein the traffic improvement value reflects a degree of traffic improvement brought by implementing the candidate tidal lane opening scheme; the traffic improvement value is related to a road feature of the target road; and the road feature of the target road at least includes features of the number of lanes of the target road, width of the lanes of the target road, and directions of the lanes of the target road.

18. The Internet of Things system of claim 12, wherein the management platform is further configured to:

based on the first traffic feature, determine a plurality of candidate tidal lane opening schemes; and based on the first traffic feature, determine the target tidal lane opening scheme from the plurality of candidate tidal lane opening schemes through a genetic algorithm.

19. The Internet of Things system of claim 18, wherein the genetic algorithm includes a coding operation, an initial coding setting, a fitness function establishment, and a plurality of iteration processes, when a fitness of coding exceeds a threshold or a number of iteration processes reaches a preset value, the genetic algorithm is completed, a candidate tidal lane opening scheme corresponding to coding with a highest fitness is used as the target tidal lane opening scheme; and the fitness reflects a comprehensive impact of traffic congestion on all roads in an entire region after applying a certain candidate tidal lane opening scheme.

20. A non-transitory computer-readable storage medium on which a computer program is stored, wherein a computer, after reading the computer program, executes the method of claim 1.

* * * * *